United States Patent [19]

Hsieh

[11] Patent Number: 4,620,952
[45] Date of Patent: Nov. 4, 1986

[54] GAS LIQUID CONTACT TRAY AND METHOD

[75] Inventor: Chang-Li Hsieh, Billerica, Mass.

[73] Assignee: Koch Engineering Company, Inc., Wichita, Kans.

[21] Appl. No.: 787,164

[22] Filed: Oct. 15, 1985

[51] Int. Cl.$^4$ .............................................. B01F 3/04
[52] U.S. Cl. ........................... 261/114 R; 261/114 VT
[58] Field of Search ..................... 261/114 R, 114 VT

[56] References Cited

U.S. PATENT DOCUMENTS

| | | | |
|---|---|---|---|
| 1,865,172 | 6/1932 | Cook | 261/114 R |
| 1,987,630 | 1/1935 | Myers | 261/114 R |
| 2,143,015 | 1/1939 | Kleinschmidt | 261/114 R |
| 3,410,540 | 11/1968 | Bruckert | 261/114 R |
| 3,784,175 | 1/1974 | Hirao | 261/114 R |
| 3,958,964 | 5/1976 | Koch | 261/114 R |
| 4,159,291 | 6/1979 | Bruckert et al. | 261/114 R |
| 4,278,621 | 7/1981 | Sigmund et al. | 261/114 R |
| 4,296,050 | 10/1981 | Meier | 261/112 |
| 4,297,329 | 10/1981 | Sigmund et al. | 261/114 R |
| 4,504,426 | 3/1985 | Chuang et al. | 261/114 R |

FOREIGN PATENT DOCUMENTS 823108 11/1959 United Kingdom ............ 261/114 R

*Primary Examiner*—Tim Miles
*Attorney, Agent, or Firm*—Richard P. Crowley

[57] ABSTRACT

A gas liquid contact tray and method of using the tray and columns containing the tray, which gas liquid contact tray is characterized by high tray efficiency and capacity and a wide turndown ratio, and which tray comprises: a tray deck containing a plurality of openings therein, such as valves, to provide for the intimate contact of an upwardly flowing gas stream through the openings with liquid on the tray deck; one or more downcomers, to provide a passageway for the transportation of liquid from the tray deck to a lower tray deck or lower portion of the column; and mass-transfer packing materials in the passageway of one or more of the downcomers, to provide for the intimate gas liquid contact of the upwardly flowing gas stream and the downwardly flowing liquid stream in the passageway of the downcomer.

20 Claims, 4 Drawing Figures

GAS LIQUID CONTACT TRAY AND METHOD

BACKGROUND OF THE INVENTION

In distillation, absorption and other chemical-separating processes and techniques, various types of vapor-liquid contacting trays, such as sieve trays, jet trays, valve trays and the like, are employed, in order to provide for intimate contact between an upwardly flowing vapor and a downwardly flowing liquid in a vapor-liquid contacting column. A wide variety of tray designs and concepts has been proposed, generally directed around improving the tray efficiency, improving the tray capacity, or improving the tray mechanical structure. However, experience has shown that these design concepts often work against each other; for example, a tray design for high efficiency typically sacrifices tray capacity and also complicates the tray mechanical structure. Furthermore, claimed tray designs of improved tray efficiency or capacity are not easily and convincingly verified in pilot-plant tests or in commercial tray towers.

It is desirable to minimize the overhead of a tray design, wherein a typical operating tray generally comprises a highly active heat mass-transfer region; that is, the froth region across the horizontal surface of the tray, a poor heat mass-transfer region; that is, the droplet disengagement region above the froth region and underneath the next tray, and the nonactive downcomer regions, where little or no vapor-liquid contact occurs. Trays designed for high liquid-loading chemical applications generally have to bear a heavy downcomer overhead.

A multiple downcomer tray has been developed which employs a sieve-type tray with multiple downcomers, with the downcomer inlet width between, for example, 1 to 4 inches, and with the downcomer outlet terminating at an elevation above the downcomer inlet of the next tray below, with a liquid seal of the downcomer provided by using orifices, spouts of screen materials (see, for example, U.S. Pat. Nos. 3,410,540, 4,159,291, 4,278,621, and 4,297,329). By terminating the downcomer above the froth on the tray below, the tray area occupied by the downcomer may be reduced by 50%. This additional tray deck can be used as an active bubbling area; for example, by putting additional valves on the tray deck below the dowmcomer, and thereby increasing the capacity of the tray. In addition downcomer back-up flooding, a major tray-capacity limiting factor in high liquid-loading applications, also can be avoided or reduced. The multiple downcomer tray, thus, provides for a high percentage of available tray area and a lower tray spacing in the column, and, for high liquid-loading applications, is equivalent to a higher tray capacity and higher efficiency per unit tower height; for example, tray spacing of 10 to 12 inches, as compared to 20 to 24 inches for a typical valve tray.

However, such sieve-type multiple-downcomer trays, for example, having a sieve-type tray deck and slotted downcomers, have an inherently poor turndown ratio. The normal turndown ratio for the valve distillation trays can be greater than 6, while for sieve trays it is usually around 3, while with multiple-downcomer sieve trays, the turndown ratio is often 2 or less. Trays have been developed employing a flexible downcomer design (see U.S. Pat. No. 3,784,175). This patent attempts to improve the poor turndown ratio of the multiple-downcomer sieve tray, while maintaining a positive downcomer seal, by employing a movable member. However, because of the questionable reliability of the movable member, such trays have not been widely accepted in the marketplace.

Some trays are composed of a plurality of plates made from a highly porous, open-pored, sintered material, particularly for use in the absorption and/or desorption of gases by liquids. Such plates are usually composed of a sintered magnesium or aluminum silicate. The plates often have a plurality of generally parallel passage openings of predetermined cross-sections extending therethrough, and include a plurality of run-off means comprised of tubes which have, at the lower end thereof, a gas shut-off device, to block the upward flow of gas in the downcomer (see, for example, U.S. Pat. No. 3,958,964). These sintered materials have very small openings, are subject to plugging, and are restricted to low liquid flow rates; therefore, the sintered materials are much different from the packing materials. Furthermore, the objective of using the sintered materials in the downcomer is to prevent gas flow up the downcomer, rather than to promote good heat and mass transfer between gas and liquid in the downcomer.

Therefore, there exists a need for an improved vapor-liquid contact tray of simple mechanical structure, but which tray can achieve high tray efficiency and high tray capacity and a wide turndown ratio, through a reduction in tray overhead.

SUMMARY OF THE INVENTION

The present invention is directed to a vapor-liquid contact tray and to vapor-liquid contacting towers containing such trays, and to a method of operating and manufacturing such trays. In particular, the invention concerns an improved valve vapor-liquid contact distillation tray for use in high liquid-loading applications, and to vapor-liquid columns containing a plurality of such trays.

The present invention concerns an improved gas liquid contacting tray, and more particularly a valve-type tray useful for high liquid-loading applications in which the downcomer is terminated above the froth level of the tray below, and the effects of vapor by-passing through the downcomer are obviated or minimized. The contact trays of the invention employ heat and/or mass-transfer packing material, and particularly a structured packing material, in one or more, and preferably all, the downcomers. Therefore, instead of sealing the downcomer area by the conventional methods, as used in the multiple-downcomer trays, or by other techniques, the high-surface-area packing material in the downcomer of the improved gas liquid contact tray of the invention is utilized to provide intimate countercurrent vapor-liquid contacting, thereby providing a tray design which can achieve high tray efficiency, high tray capacity and a wide turndown ratio. Generally, both heat and mass transfer occur during distillation and other gas liquid processes, based on temperature differences for heat transfer and concentration differences for mass transfer; however, for the purposes of this invention, the term mass transfer, as it relates to packing materials used in the downcomer, shall be employed to indicate that one or both transfers are covered or occur.

The vapor-liquid contact tray, thus, provides mass-transfer means, by the use of a structured or nonstructured packing, or a combination thereof, in the downcomer for the upwardly flowing vapor in the downcomer passageway, so that these vapors in the downcomer passageway can achieve or approach an equivalent level of mass transfer as the vapor which normally flows through the horizontal tray deck. For example, in one embodiment, the mass-transfer packing elements employed in the downcomer may comprise packing elements made of a plurality of metal sheets, such as corrugated metal sheets, which also may be provided with a plurality of apertures, as well as with fine fluting on the surface of the sheets. The flutings may be disposed on one or both sides of the sheets, and typically are in the form of grooves which extend at right angles to the axis of the column. Such packing element is commercially sold for exchange columns and is known as Flexipac (a registered trademark of Koch Engineering Company, Inc.), as described more particularly, for example, in U.S. Pat. No. 4,296,050 of Oct. 20, 1981 and other patents (hereby incorporated by reference).

The improvement in the downcomer performance of the vapor-liquid contacting tray of the present invention over the multiple-downcomer trays is dramatic, in that, in the multiple-downcomer trays, the potential efficiency drop caused by vapor by-passing through the downcomers is a major design concern. Therefore, in such multiple-downcomer trays, in order to establish a proper liquid seal on each downcomer, the downcomer exit openings are quite restrictive; for example, only a few slots are provided for liquid delivery. Since the liquid-discharge rate through a slotted-plate-type device is proportional to the square root of the liquid head above the plate, and since the allowable liquid head for each downcomer of a multiple-downcomer tray is usually less than 60% of the tray spacing, the downcomer turndown ratio for this type of multiple-downcomer tray is usually very small. For example, for a downcomer with an 8-inch maximum allowable liquid head and a 2-inch minimum required liquid seal, the downcomer turndown ratio is only 2.0; that is, $\sqrt{8}/2$. Thus, the turndown ratio for multiple-downcomer trays is usually limited to a value of approximately 2.

In the vapor-liquid contact tray of the invention, a packed bed of structured or random-type packing, or a combination, is employed in the downcomer, with a height which may vary as desired. The mass-transfer packing material employed in the downcomer may not entirely stop the upward vapor flow through the downcomer, but provides a mass-transfer means for the upward flowing vapor in the downcomer, so that this vapor can achieve a high or equivalent level of heat and/or mass transfer as the vapor normally flowing through the tray deck. This design also permits the utilization of a previously nonactive tray-deck area as an active heat and/or mass-transfer area.

The range of downcomer liquid capacity can be rated quite conservatively at 170 gpm per square foot or more of the downcomer area. Data taken with a commercial-scale tower have shown that the same downcomer can be operated satisfactorily at liquid flow rates as low as 30 gpm per square foot and as high as 400 gpm per square foot. This gives a turndown ratio greater than 10. Typically, at high liquid capacity, the downcomer will be sealed by the high downward liquid flux, while, at lower liquid loadings, vapor can by-pass through the downcomer; however, this by-passing vapor stream will undergo efficient heat and mass transfer with the high-flow stream, for example, over 30 gpm per square foot, in the packed section of the downcomer.

A further advantage of the improved vapor-liquid contact tray design is in the downcomer liquid delivery. By employing restrictive slots in the lower portion of the downcomer, the liquid streams leaving each downcomer of a multiple-downcomer tray possess a higher velocity and momentum which may disturb the performance of the next lower tray deck. Typically, to divert this liquid momentum over a broader tray-deck area, multiple downcomers are used, with the width of each downcomer less than about 4 inches. This restriction will not be severe for the improved vapor-liquid contact tray of the invention, since the down-flowing liquid will be spread more evenly over a greater area of the succeeding tray by the insert within the downcomer, thus reducing any disturbance of the liquid on the lower tray deck.

An additional advantage of the improved vapor-liquid contact tray design is in the design of the tray deck itself. The multiple-downcomer trays use sieve-type tray decks which have an inherently poor turndown ratio. One preferred embodiment of the present vapor-liquid contact tray design will use the field-proven, valve-type tray deck, for example, the Type-A or Type-T Flexitray (a registered trademark of Koch Engineering Company, Inc.). Therefore, the efficiency and the turndown ratio of the tray deck also can be improved, along with the turndown ratio of the downcomer.

The downcomer of the tray may comprise one or more downcomers on each tray in the column, and, for example, the tray may have a single-side downcomer, with the side downcomer alternating from one to the other side of the column with each tray. The tray may comprise a plurality of downcomers, typically, but not limited to, uniformly spaced across the tray deck.

The mass-transfer devices may comprise structured-type gas liquid devices, such as, but not limited to, generally parallel sheets in a close, spaced-apart relationship with flutes, apertures or corrugations, or combinations thereof, or comprise fine-opening, knitted plastic or wire mesh, or discrete particulate random-type gas liquid packing, such as plastic, ceramic or metal, pall rings, saddles and the like, or combinations, in each passageway, or on different trays of such gas liquid devices. Typically and preferred, structured sheet or mesh-type packing is used.

The mass-transfer device is usually positioned in the lower portion of the downcomer passageway, and preferably is generally flush with the bottom of the lower outlet or extends below the lower outlet; for example, 0 to 12 inches, such as 0 to 6 inches. The extension; that is, the exposed height, of the mass-transfer device permits the liquid to be spread more evenly over a larger area to the tray below, to avoid disturbance of the lower tray liquid level, and providing a more uniform liquid layer on the lower tray deck. The distance from the bottom of the mass-transfer insert to the lower tray-deck may also vary as desired, but generally ranges from about 0 to 18 inches; for example, 0 to 12 inches. The height of the mass-transfer device or insert in the downcomer may vary, but generally ranges between about 1 inch and 90%; for example; 1 inch to 70%, of the height of the tray spacing.

In the operation of a gas liquid column, such as in a distillation or separation process, the downwardly flowing liquid from the horizontal tray deck, passing through the downcomer passageway, is placed in intimate contact with the upwardly flowing gas in the passageway by means of the mass-transfer material in the passageway, to provide an active gas liquid contact area. The scrambled liquid in the passageway is then directed over a large area above the froth region and into the liquid level on the lower tray deck. The invention is particularly useful in valve trays employed in high liquid-loading operations, but is usefully adapted for other operations with other types of trays.

The invention will be described for the purpose of illustration only in connection with certain embodiments; however, changes, additions, modifications and improvements in the illustrated embodiments may be made by those persons skilled in the art, all falling within the spirit and scope of the invention.

DESCRIPTION OF THE EMBODIMENTS

Figure 1:
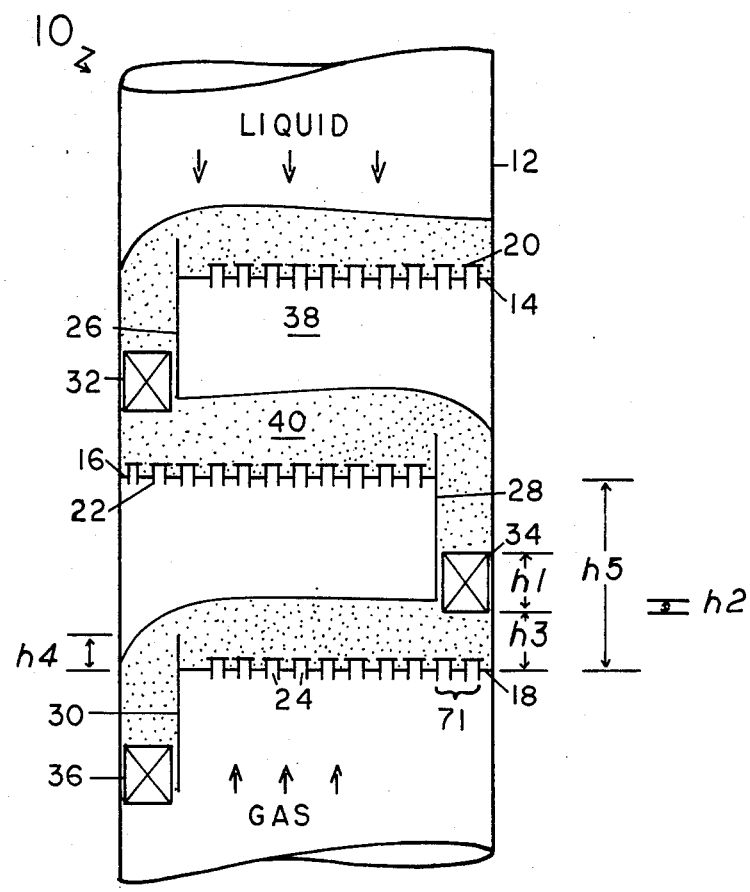
FIG. 1 is a schematic illustration of a gas liquid contact column containing the trays of the invention with side downcomers.
Figure 2:
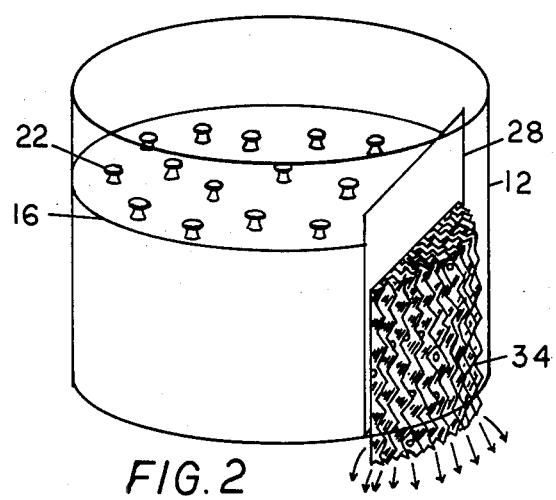
FIG. 2 is a schematic, fragmentary, perspective, illustrative view of a portion of a tray of FIG. 1.

FIG. 1 illustrates a gas liquid contact system 10, having a column 12 with a plurality of spaced-apart, horizontal valve trays 14, 16 and 18 having valves 20, 22 and 24, with side downcomers 26, 28 and 30 and with mass-transfer packing inserts 32, 34 and 36 in the downcomer passages. The inserts 32, 34 and 36 comprise spaced-apart corrugated plates with apertures and grooves therein, as described, for example, in U.S. Pat. No. 4,296,050. The inserts extend slightly below the outlet of the downcomers 26, 28 and 30. In the drawing, $h_1$ is the height of the inserts 32, 34 and 36, $h_2$ is the height of the exposed extension of the inserts 32, 34 and 36 beyond the end of the outlet of the downcomers 26, 28 and 30, $h_3$ is the height of the bottom of the extended inserts from the next lower tray, $h_4$ is the height of the weir of the downcomer extending above the tray decks 14, 16 and 18, and $h_5$ is the tray spacing. With the structured packing illustrated, $h_1$ is between 1 inch 90% of $h_5$, $h_2$ is between 0 and 4 inches and $h_3$ is between 0 and 20 inches greater than $h_4$. FIG. 2 is a perspective, illustrative view of a portion of one tray (16 of FIG. 1) also illustrating the wide distribution of the liquid from the bottom of the insert 34 over the liquid in the tray below.

For conventional valve trays, the downcomers extend very close to the tray deck of the next lower tray. For example, in FIG. 1 for a conventional tray, the downcomer would occupy an area of the tray 18, and no valves, caps, holes or other devices for achieving intimate gas liquid contact could be used in this area. By terminating the downcomer at $h_3$, this area 71 can be used to expand the bubbling area of the tray and increase its capacity, such as by the use of the same or different type valves in this area, such as valves with bubble cap-type heads, to prevent weeping in this area and to promote the transverse movement of the exiting liquid from the downcomer from this area and across the tray.

Figure 3:
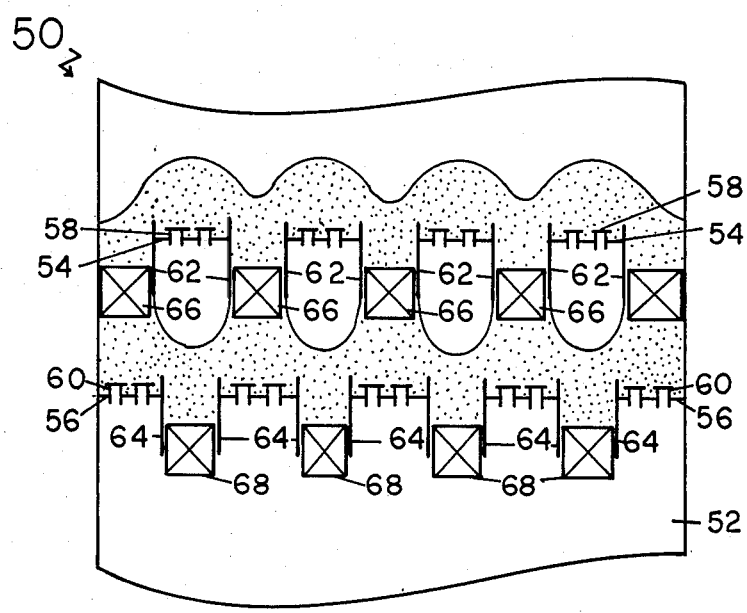
FIG. 3 is a schematic illustration of a gas liquid contact column containing the trays of the invention with multiple downcomers.

FIG. 3 illustrates a system 50 with a large-diameter gas liquid column 52; for example, over 12 feet, having valve trays 54 and 56 with valves 58 and 60, with a plurality of horizontal parallel and uniformly spaced downcomers 62 and 64 extending across the surface of the trays 54 and 56, with mass-transfer packing inserts 66 and 68 in each downcomer, such as structured corrugated sheet packing or knitted wire mesh.

Figure 4:
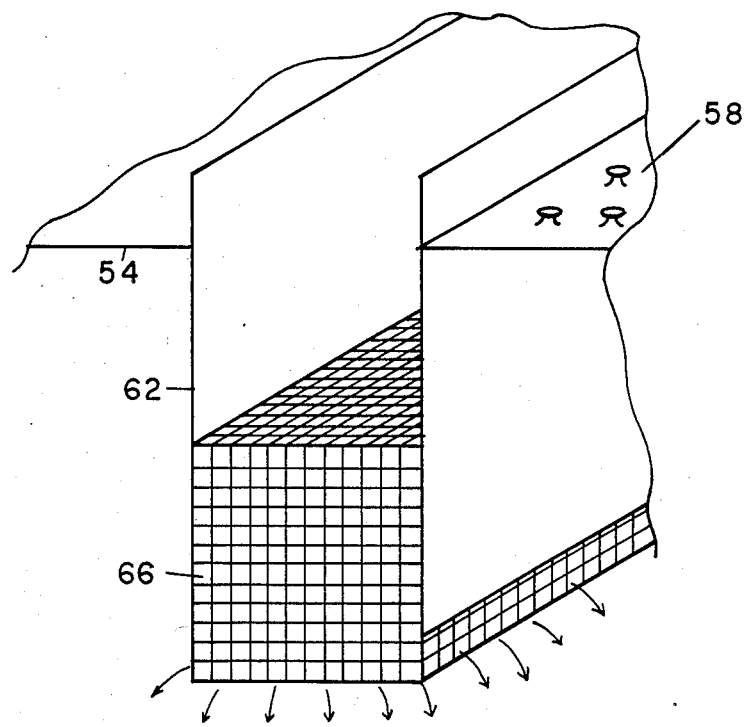
FIG. 4 is a schematic, fragmentary, perspective, illustrative view of a portion of a tray of FIG. 3.

FIG. 4 is a perspective, illustrative view of a portion of valve tray 54 with downcomer 62 and insert 66, and showing the distribution of liquid from the bottom and extended or exposed sides of the insert 66 to the tray below.

Thus, the advantage of this gas liquid contact tray over a conventional valve tray is that the downcomers, with the packing material for mass transfer, terminate above the tray deck, allowing additional tray-deck area to be used for efficient heat and mass transfer. Also, the advantage of this gas liquid contact tray over a multiple-downcomer tray is its greater turndown ratio. In the preferred embodiment, the greater turndown ratio is the result of using a valve tray deck, rather than a sieve tray deck, and using packing in the downcomers, to achieve good heat and mass transfer between the liquid and any by-passing vapor.

What is claimed is:

1. A gas liquid contact tray for use in a gas liquid contacting column for use in high liquid-loading operations, which tray comprises:
  (a) a tray-deck means having openings, to provide for a liquid level on the tray deck and for the intimate contact of an upwardly flowing gas stream through the openings, with liquid on the tray deck;
  (b) a downcomer means having an inlet and an outlet, to provide a passageway for the transportation of liquid from the tray deck to a lower section of the column in which the tray is to be installed, the liquid from the tray deck passing through the passageway in the downcomer means; and
  (c) a mass-transfer packing material means within the passageway of the downcomer means, to provide for the intimate gas liquid contact in at least a portion of the passageway of the upwardly flowing gas stream and the downwardly flowing liquid stream in the downcomer from the upper tray, thereby providing a tray characterized by high tray efficiency and capacity and a wide turndown ratio.

2. The tray of claim 1 wherein the tray-deck means comprises a plurality of movable valves or caps thereon.

3. The tray of claim 1 which includes a plurality of downcomer means generally uniformly spaced across the deck surface of the tray.

4. The tray of claim 1 wherein the mass-transfer means comprises a randomly dumped packing material disposed in the downcomer passageway.

5. The tray of claim 1 wherein the mass-transfer means comprises a structured packing material in the downcomer passageway.

6. The tray of claim 5 wherein the mass-transfer means comprises a plurality of corrugated plates which are provided with a plurality of apertures therein disposed in a spaced-apart relationship within the passageway of the downcomer means.

7. The tray of claim 1 wherein the mass-transfer means has a vertical height of between 1 inch and 90% of the spacing between the respective trays in the gas liquid contact column.

8. The tray of claim 1 wherein the mass-transfer means has an exposed height of approximately 1 to 4 inches below the outlet of the passageway of the downcomer.

9. The tray of claim 1 wherein the mass-transfer means has a mass-transfer-means-to-tray-deck height between 0 and 15 inches above the outlet weir height of the tray deck.

10. The tray of claim 1 wherein the tray-deck means extends substantially across the entire tray deck, except for the inlet of the downcomer means.

11. The tray of claim 1 characterized by a turndown ratio of 5 or more.

12. The tray of claim 1 wherein the downcomer means operates at 30 to 400 gpm per square foot.

13. A gas liquid column containing a plurality of gas liquid contacting trays therein for high liquid-loading operations, which gas liquid column contains a plurality of the gas liquid trays of claim 1 is a spaced-apart relationship.

14. The gas liquid column of claim 13 wherein the outlet of the gas liquid contact tray is above the froth region of the next lower tray.

15. The gas liquid column of claim 14 wherein the outlet of the gas liquid contact tray is above a region of the next lower tray containing valves or caps.

16. A gas liquid contact valve tray for use in a gas liquid contacting column for high liquid-loading operations, which valve tray comprises:
  (a) a valve-tray-deck means which provides a plurality of valves therein, to maintain a defined liquid level on the valve-tray deck and for intimate contact of an upwardly flowing gas stream through the valves, with the liquid on the tray deck;
  (b) one or more downcomer means, the downcomer having an upper inlet and a lower outlet and defining a passageway, to provide for the transfer of liquid, after it has reached a defined height above a weir outlet on the tray deck, from the tray deck to a lower tray or lower section of the gas liquid contactor in which the valve tray is installed, the liquid passing through the passageway from the upper inlet and discharged from the lower outlet; and
  (c) mass-transfer packing material means disposed in the passageway of the downcomer means and extending generally flush with or below the lower outlet of the passageway, which mass-transfer packing material means comprises a mesh-type packing or a plurality of spaced-apart corrugated plates which are optionally provided with a plurality of apertures therein, and characterized by flutings or grooves and disposed in the passageway of the downcomer means, to provide for the intimate gas liquid contact in the passageway of the upwardly flowing gas stream and the downwardly flowing liquid stream, thereby providing a tray characterized by a high tray efficiency and capacity and a wide turndown ratio.

17. The tray of claim 16 wherein $h_1$ is 1 inch to 90% of $h_5$, $h_2$ is 0 to 4 inches and $h_3$ is 0 to 20 inches greater than $h_4$.

18. A gas liquid column containing a plurality of the gas liquid contacting valve trays of claim 16.

19. The column of claim 18 wherein the outlet of the downcomer of at least one gas-liquid contact tray is disposed above the froth region of the next lower tray, and the area beneath the downcomer outlet has valve or bubble cap means, to divert liquid from the downcomer outlet transversely across the lower tray.

20. In a method for the contacting of an upwardly flowing gas stream with a downwardly flowing liquid stream in a column containing a plurality of spaced-apart, horizontally disposed trays having a tray deck with a plurality of tray openings and one or more tray downcomers, which method comprises:
  (a) passing an upwardly flowing gas stream through the tray openings and into intimate contact with liquid on the tray deck; and
  (b) flowing the liquid on the tray deck downwardly through the downcomer and discharging the liquid onto the tray deck of the lower tray, the improvement which comprises
    (i) passing the upwardly flowing gas stream through mass-transfer material disposed in the passageway of the tray downcomer and into intimate contact with downwardly flowing liquid in the passageway, and
    (ii) discharging the liquid passing downwardly from the downcomer passageway onto a lower tray deck and into an area containing openings for the upward passage of the gas stream.

* * * * *